US006499250B2

(12) United States Patent
Weder

(10) Patent No.: US 6,499,250 B2
(45) Date of Patent: *Dec. 31, 2002

(54) FLORAL SLEEVE HAVING A SKIRT AND DETACHABLE PORTION

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/838,104

(22) Filed: Apr. 19, 2001

(65) Prior Publication Data

US 2002/0144462 A1 Oct. 10, 2002

Related U.S. Application Data

(63) Continuation of application No. 09/357,398, filed on Jul. 20, 1999, now Pat. No. 6,266,920, which is a continuation of application No. 08/799,665, filed on Feb. 11, 1997, now abandoned, which is a continuation of application No. 08/453,719, filed on May 30, 1995, now abandoned, which is a continuation of application No. 08/220,852, filed on Mar. 31, 1994, now Pat. No. 5,572,851.

(51) Int. Cl.⁷ .................................................. A47G 7/08
(52) U.S. Cl. ........................................................ 47/72
(58) Field of Search ............................... 47/72; 206/423

(56) References Cited

U.S. PATENT DOCUMENTS

| 524,219 A | 8/1894 | Schmidt |
|---|---|---|
| 732,889 A | 7/1903 | Paver |
| 950,785 A | 3/1910 | Pene |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake .......................... 229/87 |

(List continued on next page.)

FOREIGN PATENT DOCUMENTS

| AU | 4231978 | 6/1979 |
|---|---|---|
| BE | 654427 | 1/1965 |
| CH | 560532 | 4/1975 |
| DE | 345464 | 12/1921 |
| DE | 513971 | 11/1930 |
| DE | 1166692 | 3/1964 |

(List continued on next page.)

OTHER PUBLICATIONS

Speed Cover Brochure, "The Simple Solution For Those Peak Volume Periods", Highland Supply Corporation, ©1989.

(List continued on next page.)

Primary Examiner—Peter M. Poon
Assistant Examiner—Jeffrey L. Gellner
(74) Attorney, Agent, or Firm—Dunlap, Codding & Rogers, P.C.

(57) ABSTRACT

A plant package, comprising a pot containing a floral grouping and a flexible sleeve having detaching elements at preselected areas, the sleeve further including a bonding material which connects the sleeve to the pot when the pot is positioned within the sleeve. The sleeve is positioned about the pot and a lower portion of the sleeve closely surrounds and encompasses the pot, an upper portion of the sleeve extending upwardly from the pot and substantially surrounding and encompassing the floral grouping contained within the pot, at least a portion of the sleeve being removable via the detaching elements, leaving a portion of the sleeve which is a decorative plant cover.

31 Claims, 9 Drawing Sheets

U.S. PATENT DOCUMENTS

| | | | |
|---|---|---|---|
| 1,863,216 A | 6/1932 | Wordingham | |
| 1,978,631 A | 10/1934 | Herrlinger | 91/68 |
| 2,048,123 A | 7/1936 | Howard | 229/87 |
| RE21,065 E | 5/1939 | Copeman | 93/2 |
| 2,170,147 A | 8/1939 | Lane | 206/56 |
| 2,200,111 A | 5/1940 | Bensel | 229/1.5 |
| 2,278,673 A | 4/1942 | Savada et al. | 154/43 |
| 2,302,259 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNab | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 299/53 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,941,572 A | 7/1990 | Harris | 206/423 |
| 4,980,209 A | 12/1990 | Hill | 428/34.1 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,428,939 A | 4/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,572,849 A | 11/1996 | Weder et al. | 53/399 |
| 5,572,851 A | 11/1996 | Weder | 53/399 |
| 5,575,133 A | 11/1996 | Weder et al. | 53/397 |
| 5,595,022 A * | 1/1997 | Wedert | 47/72 |
| 5,617,703 A | 4/1997 | Weder | 53/413 |
| 5,624,320 A | 4/1997 | Martinez | 472/51 |
| 5,625,979 A | 5/1997 | Weder | 47/72 |
| 5,628,146 A | 5/1997 | Weder et al. | 47/72 |
| 5,640,805 A | 6/1997 | Weder | 47/72 |
| 5,647,168 A | 7/1997 | Gilbert | 47/72 |
| 5,687,845 A | 11/1997 | Weder | 47/72 X |
| 5,735,103 A | 4/1998 | Weder | 53/399 |
| 5,842,569 A | 12/1998 | Weder | 47/72 X |
| 6,009,687 A | 1/2000 | Weder | 53/397 X |
| 6,023,885 A * | 2/2000 | Weder | 47/72 |
| 6,195,937 B1 * | 3/2001 | Weder | 47/72 |
| 6,266,920 B1 * | 7/2001 | Weder | 47/72 |
| 2001/0009082 A1 * | 7/2001 | Weder | 47/72 |

FOREIGN PATENT DOCUMENTS

| | | |
|---|---|---|
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2610604 | 8/1988 |

| | | |
|---|---|---|
| FR | 2603159 | 3/1989 |
| FR | 2619698 | 3/1989 |
| GB | 5605 | 5/1885 |
| GB | 2056410 | 3/1981 |
| GB | 2074542 | 11/1981 |
| GB | 2128083 | 4/1984 |
| GB | 2252708 | 8/1992 |
| GB | 1204647 | 9/1997 |
| IT | 224507 | 4/1996 |
| JP | 542958 | 2/1993 |
| NL | 8301709 | 12/1984 |
| NL | 1000658 | 1/1996 |
| WO | 9315979 | 8/1993 |

OTHER PUBLICATIONS

"Speed Sheets and Speed Rolls" Brochure, Highland Supply Corporation, ©1990.
"Color Them Happy with Highlander Products", ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992, 2 pages.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable disclose adhesively attaching the covering to the container. 1988.

* cited by examiner

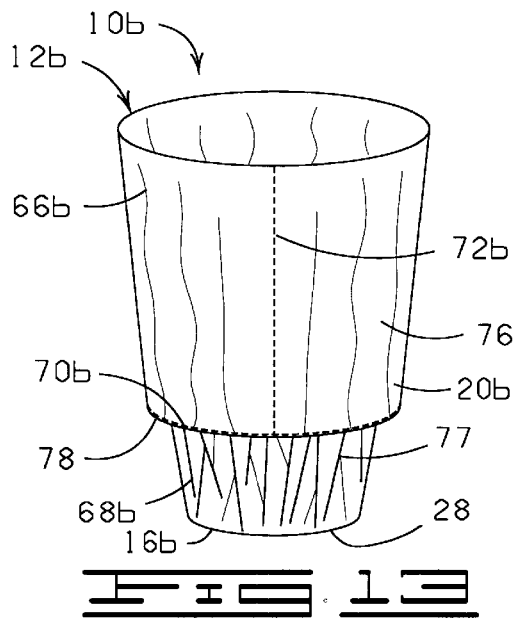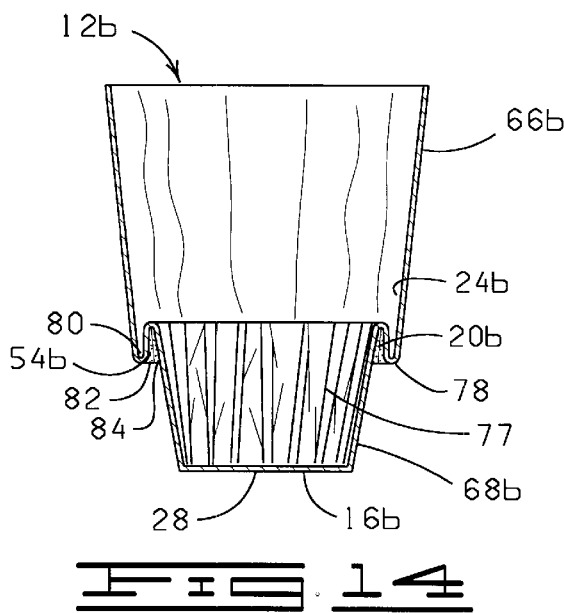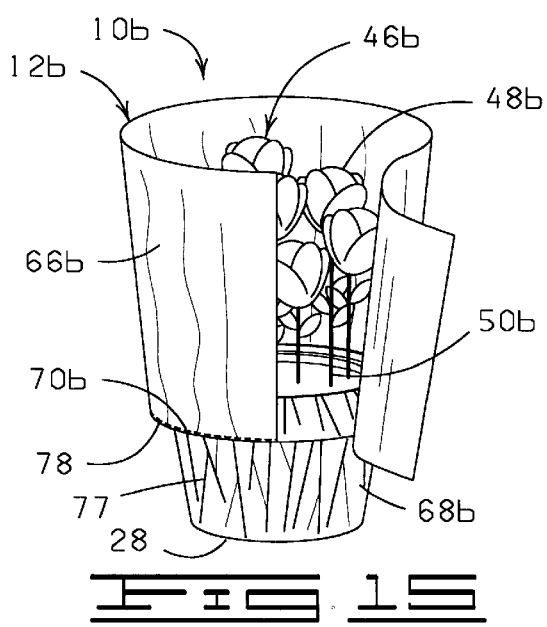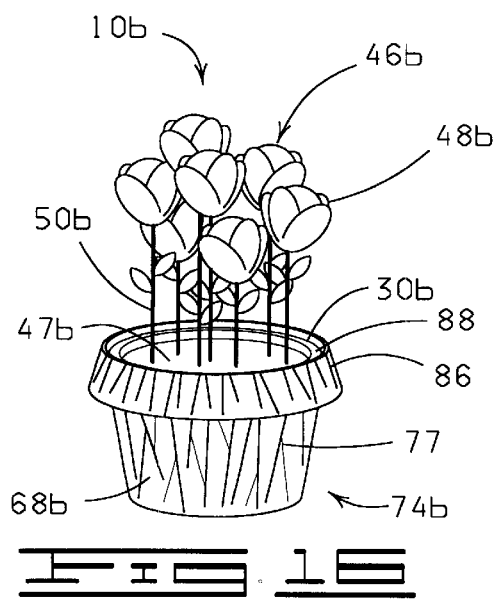

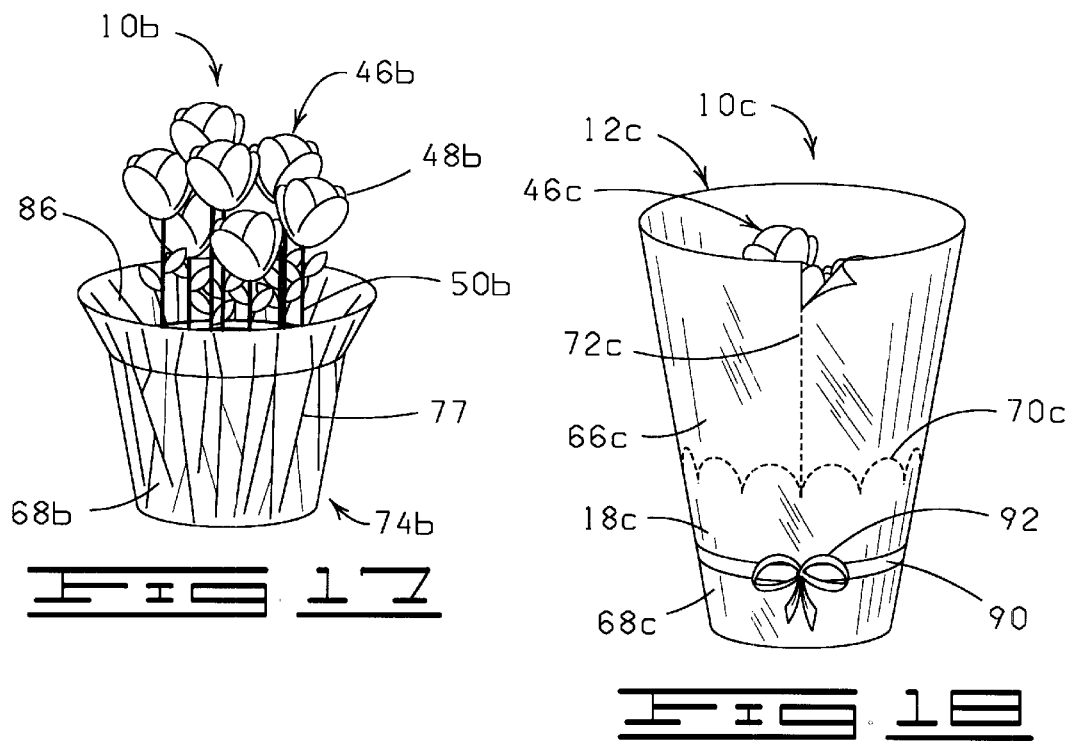
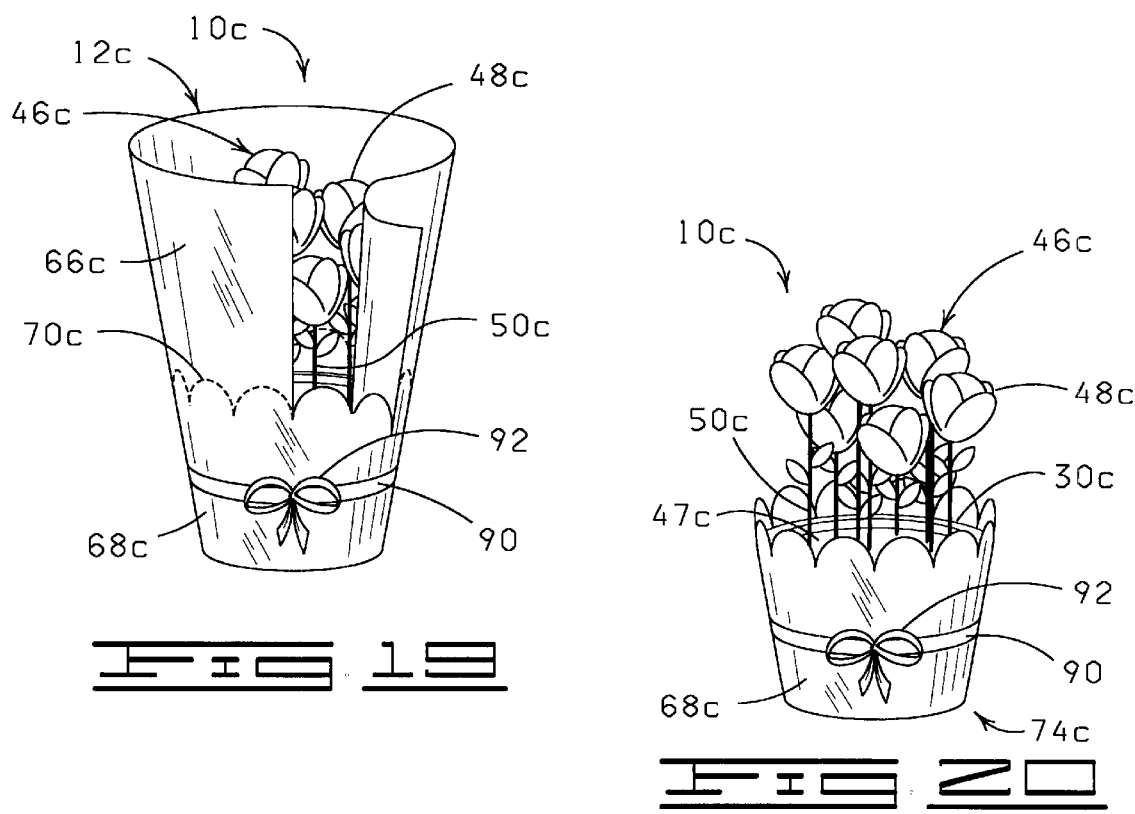

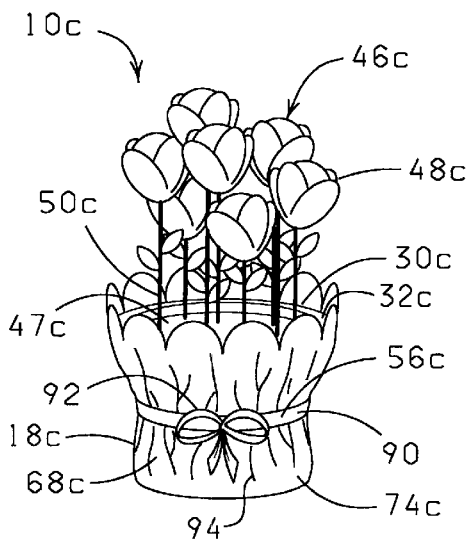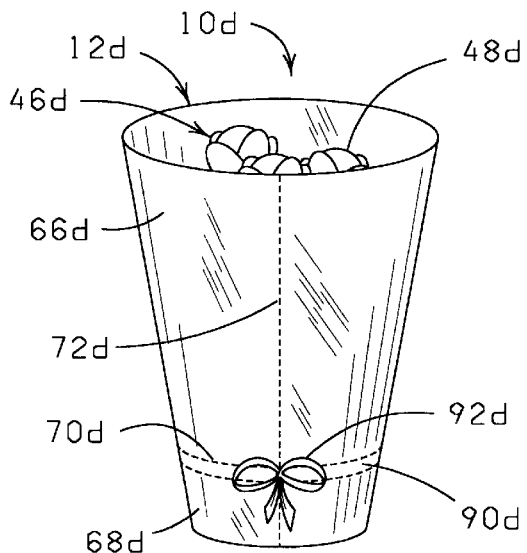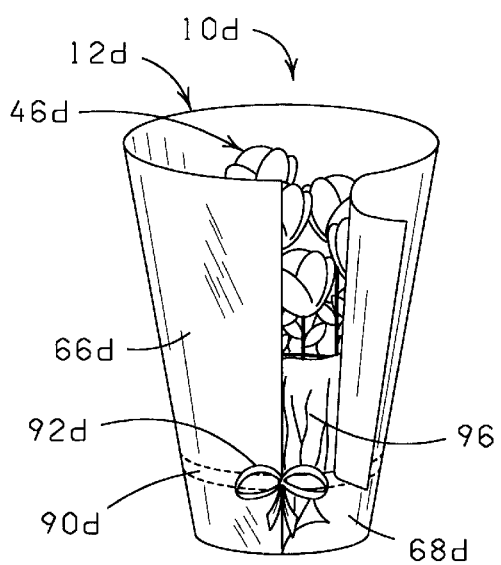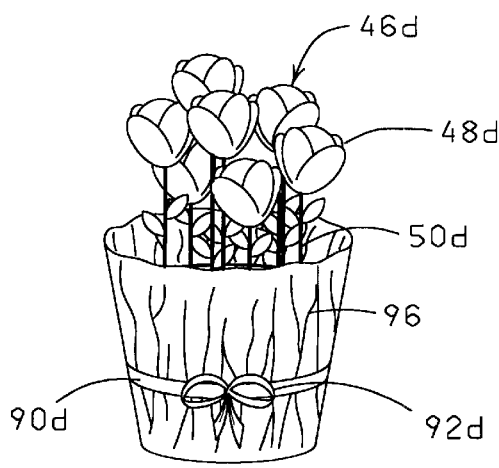

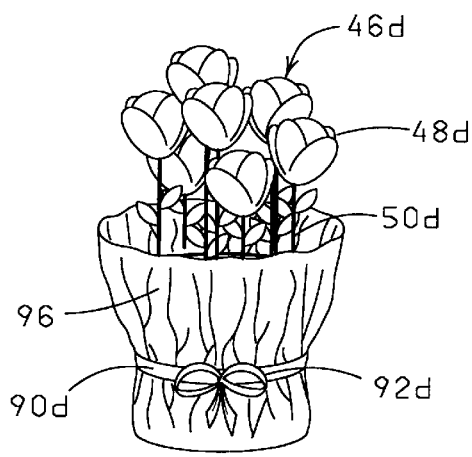
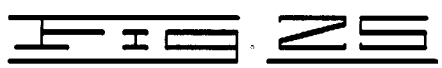
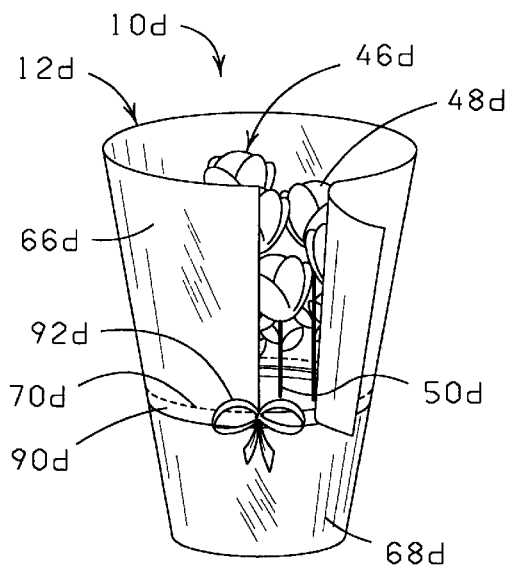
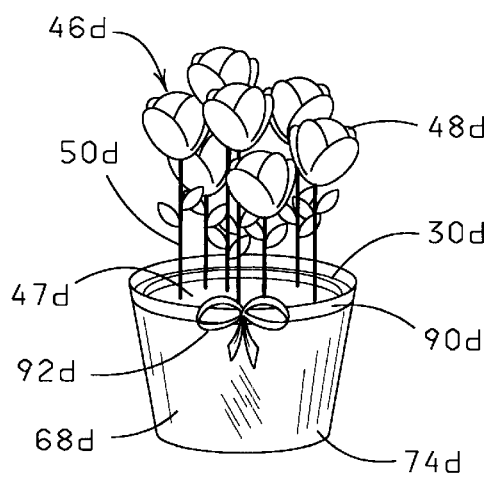
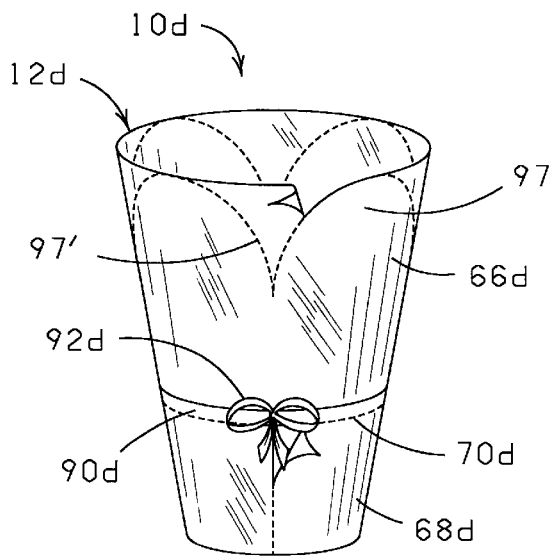

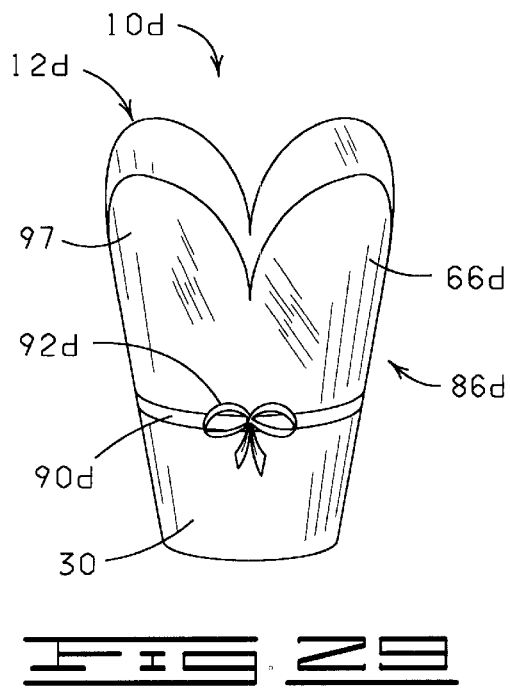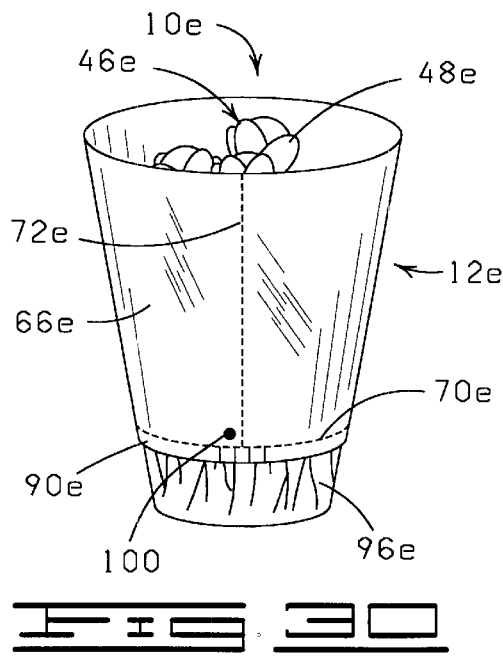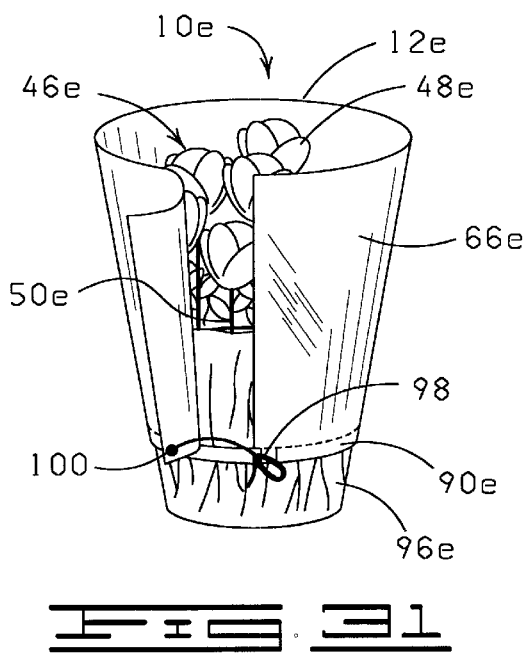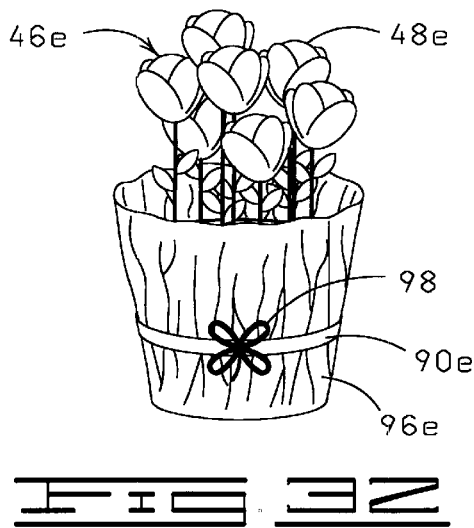

FLORAL SLEEVE HAVING A SKIRT AND DETACHABLE PORTION

CROSS REFERENCE TO RELATED APPLICATIONS

The present application is a continuation of U.S. Ser. No. 09/357,398, filed Jul. 20, 1999, now U.S. Pat. No. 6,266,920, which is a continuation of U.S. Ser. No. 08/799,665, filed Feb. 11, 1997, now abandoned, which is a continuation of U.S. Ser. No. 08/453,719, filed May 30, 1995, now abandoned, entitled FLORAL SLEEVE HAVING A DETACHABLE PORTION, which is a continuation of U.S. Ser. No. 08/220,852, filed Mar. 31, 1994, now U.S. Pat. No. 5,572,851, entitled PLANT PACKAGE HAVING DETACHABLE SLEEVE AND METHODS.

FIELD OF THE INVENTION

This invention generally relates to packaging materials, and, more particularly, packaging materials used to wrap flower pots containing floral groupings and/or mediums containing floral groupings, and methods of using same.

BRIEF DESCRIPTION OF THE DRAWINGS

FIG. 13 is a perspective view of a modified plant package, showing a sleeve having a circumferential overlapping fold and a closed bottom.

FIG. 14 is a cross-sectional view of the plant package of FIG. 13, showing the circumferential overlapping fold and a bonding material connecting at least a portion of the circumferential overlapping fold together.

FIG. 15 is a perspective view of the plant package of FIG. 13, showing an upper portion of the sleeve being detached from a lower portion via vertical perforations in the upper portion and circumferential perforations.

FIG. 16 is a perspective view of the plant package of FIG. 13, showing an upper portion of the sleeve detached, and showing a remaining lower portion of the sleeve with a skirt attached to an opening, the skirt angle extending downward and outward.

FIG. 17 is a perspective view of the plant package of FIG. 16, showing the skirt angle extending upwardly and outwardly.

FIG. 18 is a perspective view of a modified plant package similar to the plant package of FIGS. 11 and 12, showing a scalloped design along circumferential perforations, and showing a ribbon having a bow, the ribbon extending around the sleeve.

FIG. 19 is a perspective view of the plant package of FIG. 18, showing an upper portion of the sleeve being removed.

FIG. 20 is a perspective view of the plant package of FIG. 18, showing a remaining lower portion forming a decorative plant cover with a scalloped edge.

FIG. 21 is a perspective view of the plant package of FIG. 20, showing the decorative plant cover crimped by the ribbon which extends thereabout.

FIG. 22 is a perspective view of a modified plant package similar to the plant package shown in FIG. 1, having vertical perforations extending through both an upper portion and a lower portion of a sleeve, and having two parallel circumferential perforations which form a ribbon appearance thereabout with a bow, and further having a second decorative plant cover enclosed within the sleeve.

FIG. 23 is a perspective view of the plant package of FIG. 22, showing both the upper portion and the lower portion of the sleeve being removed, the ribbon and bow remaining disposed about the second decorative plant cover.

FIG. 24 is a perspective view of the plant package of FIG. 22, showing both the upper portion and the lower portion of the sleeve removed, the ribbon and bow remaining disposed about the second decorative plant cover.

FIG. 25 is a perspective view of the plant package of FIG. 22, showing both the upper portion and the lower portion of the sleeve removed, the remaining ribbon and bow extending about and crimping the remaining second decorative plant cover.

FIG. 26 is a perspective view of a modified plant package similar to the plant package shown in FIG. 22, showing a vertical perforations extending only through an upper portion and only one circumferential perforation, the upper portion shown as partially detached from a lower portion.

FIG. 27 is a perspective view of the plant package of FIG. 26, showing the upper portion removed, the lower portion forming a decorative plant cover having a bow with a ribbon extending thereabout.

FIG. 28 is a perspective view of a modified plant package similar to the plant package shown in FIG. 22, showing a plurality of decorative perforations defining a plurality of decorative sections in an upper portion, the upper portion having no vertical perforation, only a single circumferential perforation, a lower portion having a vertical perforation shown partially detached, and with one of the plurality of decorative perforations shown as partially detached as well.

FIG. 29 is a perspective view of the plant package of FIG. 28, showing the lower portion removed, the upper portion having the plurality of decorative sections removed, forming a decoration in the upper portion having a ribbon and bow, and, along with a pot, together forming a decorative plant cover.

FIG. 30 is a perspective view of a modified plant package similar to the plant package of FIGS. 22–25, showing a sleeve having only an upper portion and a ribbon and a pull bow having a pull portion attached to the upper portion of the sleeve.

FIG. 31 is a perspective view of the plant package of FIG. 30, showing the upper portion of the sleeve being removed, the pull portion of the pull bow acting to cause loops to be formed in a bow section.

FIG. 32 is a perspective view of the plant package of FIG. 30, showing the upper portion of the sleeve removed, the ribbon remaining disposed about a second decorative plant cover, the pull portion detached and the pull bow formed into a plurality of loops.

DESCRIPTION OF THE PREFERRED EMBODIMENTS

The Embodiments and Methods of Use of FIGS. 1–10

Figure 1:
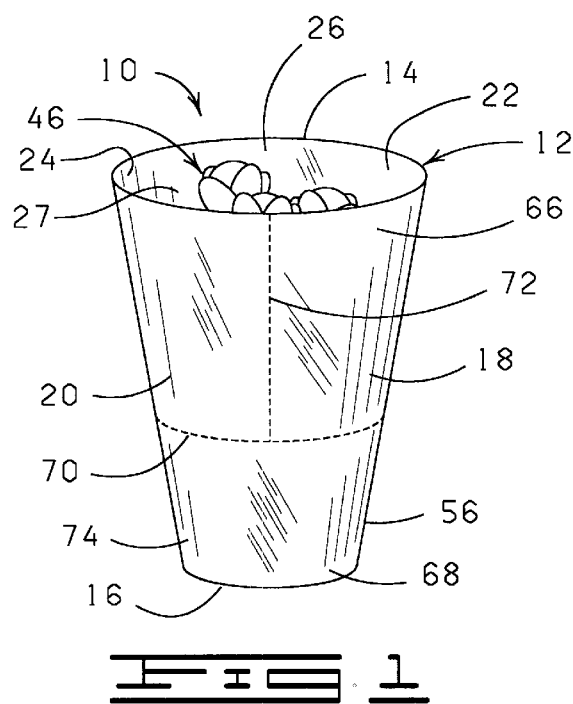
FIG. 1 is a perspective view of a plant package constructed in accordance with the present invention, showing a sleeve having both vertical and circumferential perforations therein, the circumferential perforations dividing the sleeve into an upper portion and a lower portion.

Shown in FIG. 1 and designated therein by the general reference numeral 10 is a plant package. The plant package 10 comprises a sleeve 12 which is generally tubular in shape. The sleeve 12 has a first end 14, a second end 16, an outer periphery or outer surface 18 and an opening 22, intersecting both the first end 14 and the second end 16, forming an inner surface or inner periphery 24 providing a retaining space 27 therein. In some embodiments (shown in FIGS. 13–18, and discussed in detail below), the second end 16 is closed, forming a closed base, and the opening 22 only intersects the first end 14 of the sleeve 12. Equipment and devices for forming sleeves are commercially available, and well known in the art.

Figure 2:
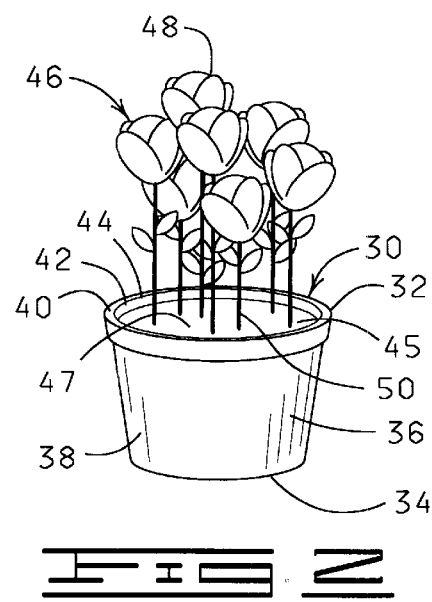
FIG. 2 is a perspective view of a pot having a growing medium therein, a floral grouping being disposed in the growing medium within the pot.

The plant package 10 may also contain a pot 30 (FIG. 2). The pot has an upper rim 32, a lower end 34, and an outer periphery or outer surface 38. An opening 40 intersects the upper rim 32, forming an inner surface or inner periphery 42. The lower end 34 of the pot 30 is closed; therefore, a pot retaining space 45 is formed and is defined by the inner surface 42 and closed lower end 34. The term "pot" refers to any type of container used for holding a floral grouping or a potted plant. Examples of pots used in accordance with the present invention include, but not by way of limitation, clay pots, wooden pots, plastic pots, and the like. The pot 30 is adapted to receive a floral grouping 46 in the pot retaining space 45.

The plant package 10 also comprises the floral grouping 46 (FIG. 2). The floral grouping 46 may be disposed in the opening 40 in the pot 30, in the pot retaining space 45 along with a suitable growing medium 47, which will be described in further detail below, or other retaining medium, such as but not by way of limitation, a floral foam. It will also be understood that the floral grouping 46, and any appropriate growing medium 47 or other retaining medium, may be disposed in the sleeve 12 without the pot 30 provided the second end 16 of the sleeve 12 is closed. The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping 46. The floral grouping 46 comprises a bloom or foliage portion 48 and a stem portion 50. Further, the floral grouping 46 may comprise a growing potted plant having a root portion (not shown) as well. However, it will be appreciated that the floral grouping 46 may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

Figure 3:
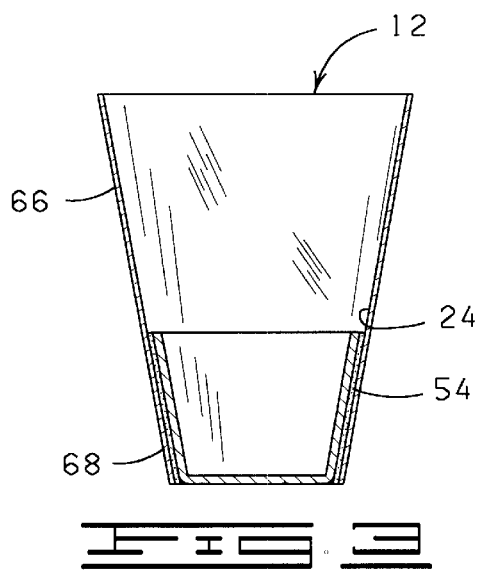
FIG. 3 is a cross-sectional view of a plant package similar to FIG. 1, showing the sleeve having a bonding material connected to an inner surface of the sleeve, and a pot contained within the sleeve, the bonding material connecting the pot to the inner surface of the sleeve.
Figure 4:
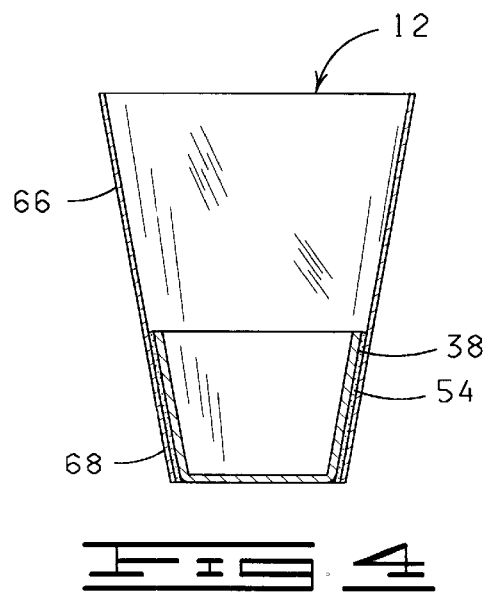
FIG. 4 is a cross-sectional view of a plant package similar to FIG. 1, showing the sleeve having a bonding material connected to an outer surface of a pot, the bonding material connecting the outer surface of the pot to the inner surface of the sleeve.
Figure 5:
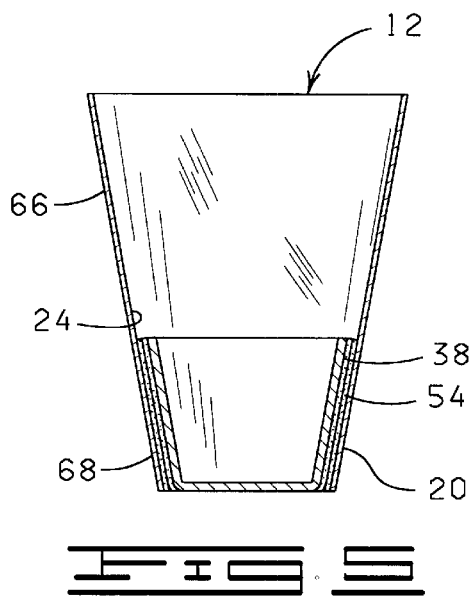
FIG. 5 is a cross-sectional view of a plant package similar to FIG. 1, showing a sleeve having a bonding material connected to an inner surface of the sleeve and a pot having a bonding material connected to an outer surface of the pot, both bonding materials cooperating to connect the outer surface of the pot and the inner surface of the sleeve together.

A bonding material 54 (FIGS. 3–5) may be disposed on at least a portion of the inner surface 24 of the sleeve 12, as shown in FIG. 3, or, alternatively, the bonding material 54 may be disposed on the outer surface 38 of the pot 30 contained within the sleeve 12, as illustrated in FIG. 4, while the sleeve 12 may be free of the bonding material 54. In a further alternative, the bonding material 54 may be disposed both on at least a portion of the outer surface 38 of the pot 30 as well as upon at least a portion of the inner surface 24 of the sleeve 12, as shown in FIG. 5. In addition, a portion of a bonding material (not shown) may also be disposed on the outer surface 18 of the sleeve 12. It will be understood that the bonding material 54 may be disposed in a solid section of bonding material 54, as shown in FIG. 3, for example. The bonding material 54 may also be disposed upon either the outer surface 18 or the inner surface 24 of the sleeve 12, as well as upon the outer surface 38 of the pot 30. Further, the bonding material 54 may be disposed in strips of bonding material 54, spots of bonding material 54, or in any other geometric, non-geometric, asymmetric, or fanciful form, and in any pattern including covering either the entire inner surface 24 of the sleeve 12 and/or the outer surface 38 of the pot 30. The bonding material 54 is disposed on the sleeve 12 and/or pot 30 by any means known in the art.

The sleeve 12 is generally tubularly shaped, but the sleeve 12 may be, by way of example but not by way of limitation, cylindrical, frusto-conical, or a combination of both frusto-conical and cylindrical (not shown). Further, as long as a generally tubular shape is maintained in at least a portion of the sleeve 12, any shape, whether geometric, non-geometric, asymmetrical and/or fanciful may be utilized. The sleeve 12 may also be equipped with drains or ventilation holes (not shown), or can be made from permeable or impermeable materials.

The sleeve 12 has a thickness in a range from about 0.1 mil to about 30 mils. Often, the thickness of the sleeve 12 is in a range from about 0.5 mil to about 10 mils. Preferably, the sleeve 12 has a thickness in a range from about 0.1 mil to about 5 mils. The sleeve 12 is constructed of a material which is flexible.

The sleeve 12 may be constructed of a single layer of material or a plurality of layers of the same or different types of materials. Any thickness of the material may be utilized in accordance with the present invention as long as the material is wrappable about an object, such as the floral grouping 46 and/or the pot 30, as described herein. The layers of material comprising the sleeve 12 may be connected together or laminated or may be separate layers. Materials used to construct the sleeve 12 are described in U.S. Pat. No. 5,111,637 entitled "Method For Wrapping A Floral Grouping" issued to Weder et al., on May 12, 1992, which is hereby incorporated herein by reference.

As noted earlier, the bonding material 54 may be disposed on at least a portion of at least one surface of the sleeve 12. The bonding material 54 may be applied as a strip or as spots or other shapes, as described above. One method for disposing the bonding material 54 on at lease one surface of the sleeve 12 and/or the outer peripheral surface 38 of the pot 30, in this case an adhesive, is described in U.S. Pat. No. 5,111,637 entitled "Method For Wrapping A Floral Grouping" issued to Weder et al., on May 12, 1992, which has been expressly incorporated herein by reference above.

The term "bonding material" when used herein includes an adhesive, frequently a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also includes any type of material or thing which can be used to effect the bonding or connecting of the two adjacent portions of the material or sheet of material to effect the connection or bonding described herein. The term "bonding material" also includes ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal using a cold seal adhesive is utilized upon the material to form a sleeve. The term "bonding material" includes this cold seal adhesive. The cold seal adhesive adheres only to a similar substrate, acting similarly as a cohesive, and binds only to itself. The cold seal adhesive, since it adheres (or coheres) only to a similar substrate, does not cause a residue to build up on equipment, thereby permitting much more rapid disposition and use to form articles. A cold seal adhesive differs also from, for example, a pressure sensitive adhesive, in that a cold seal adhesive is not readily releasable.

The term "bonding material" when used herein also includes any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

The sleeve 12 may be constructed of a single layer of material or a plurality of layers of the same or different types of materials. Any thickness of layer of material may be utilized in accordance with the present invention as long as the material may be formed into at least a portion of the sleeve 12, as described herein, and as long as the formed sleeve 12 may contain at least a portion of the pot 30 and/or the floral grouping 46, as described herein. Additionally, an insulating material such as bubble film, preferable as one of two or more layers, can be utilized in order to provide additional protection for the item, such as the floral grouping 46, contained therein.

In one embodiment, the sleeve 12 may be constructed from two polypropylene films. The polypropylene films comprising the sleeve 12 may be connected together or laminated or may be separate layers. In an alternative embodiment, the sleeve 12 may be constructed from only one polypropylene film.

The sleeve 12 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of the pot 30. This connecting engagement is preferably temporary in that the material may be easily removed, i.e., the cling material "clings" to the pot 30.

The cling material is constructed and treated if necessary, from polyethylene such as Cling Wrap made by Glad®, First Brands Corporation, Danbury, Conn. The thickness of the cling material will, in part, depend upon the size of the sleeve 12 and the pot 30 of the plant package 10, i.e., generally, the larger pot 30 therefore may require a thicker and therefore stronger cling material. The cling material will range in thickness from less than about 0.1 mil to about 10 mils, and preferably less than about 0.5 mil to about 2.5 mils and most preferably from less than about 0.6 mil to about 2 mils. However, any thickness of cling material may be utilized in accordance with the present invention which permits the cling material to function as described herein.

The sleeve 12 is constructed from any suitable material that is capable of being wrapped about the pot 30 and/or the floral grouping 46, and formed into the plant package 10 as described herein. Preferably, the material comprises paper (untreated or treated in any manner), metal foil, polymeric film, non-polymeric film, fabric (woven or nonwoven or synthetic or natural), cardboard, fiber, cloth, burlap, or laminations or combinations thereof.

The term "polymeric film" means a man-made polymer such as a polypropylene or a naturally occurring polymer such as cellophane. A polymeric film is relatively strong and not as subject to tearing (substantially non-tearable), as might be the case with paper or foil.

The material comprising the sleeve 12 may vary in color. Further, the material comprising the sleeve 12 may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the material comprising the sleeve 12. Moreover, each surface of the material used in constructing the sleeve 12 may vary in the combination of such characteristics. The material utilized for the sleeve 12 itself may be opaque, translucent, transparent, or partially clear or tinted transparent.

Figure 6:
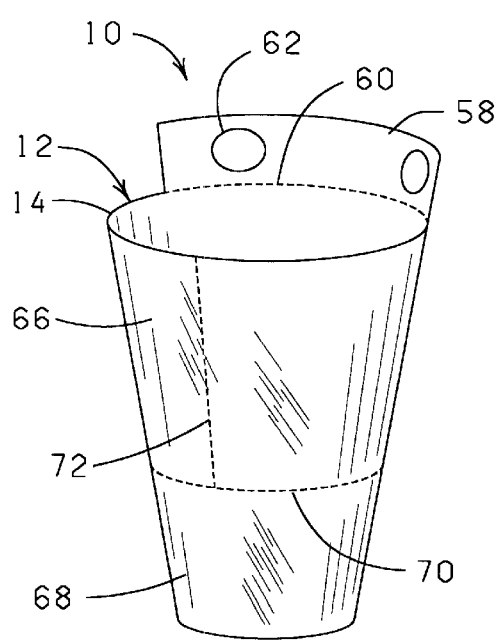
FIG. 6 is a perspective view of a plant package showing a sleeve having a detachable extension attached to a portion of an upper end of the sleeve, the extension having apertures therein.
Figure 7:
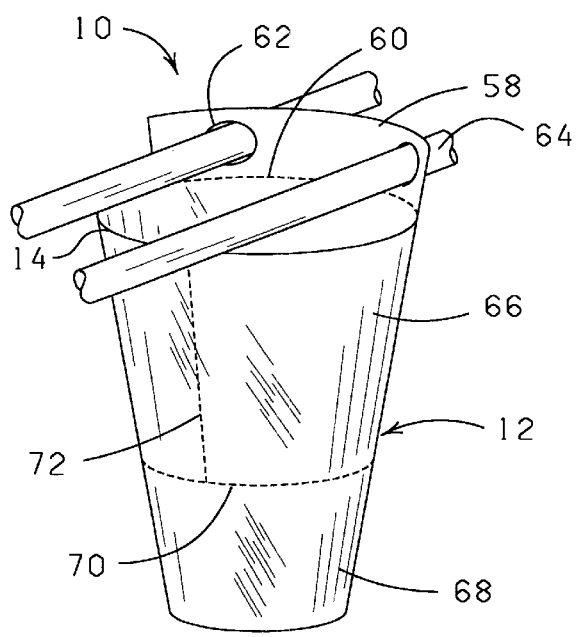
FIG. 7 is a perspective view of the plant package of FIG. 6, showing both the sleeve and the extension with rods extending through the apertures in the extension.

The sleeve 12 may further include an extension 58, as shown in FIGS. 6 and 7. The extension 58 has a plurality of perforations 60 in the sleeve 12 near the first end 14. The extension 58 has one or more apertures 62 (only one aperture designated by the numeral 62) disposed therein. The apertures 62 permit the sleeve 12, or the complete plant package 10, to be placed on a rod or a set of rods 64, also known as wickets (only one of the set of rods referred to herein by the numeral 64), for shipment, storage, assembly of the plant package 10, or other function known in the art.

The sleeve 12 further has an upper portion 66 and a lower portion 68 (FIGS. 1 and 3–9). The sleeve 12 also has detaching elements 69 in preselected areas. "Detaching element," as used herein, means any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith. The detaching element 69 includes a plurality of generally circumferential perforations 70 (FIGS. 1 and 6–9) disposed about the sleeve 12 so as to divide the upper portion 66 of the sleeve 12 from the lower portion 68 of the sleeve 12. The detaching element 69 further includes a plurality of vertical perforations 72 (FIGS. 1 and 6–9) which are disposed in a vertical line in the upper portion 66 of the sleeve 12, generally extending between the circumferential perforations 70 and the first end 14 of the sleeve 12. The upper portion 66 is separable from the lower portion 68 by tearing the upper portion 66 along both the vertical perforations 72 and the circumferential perforations 70, thereby detaching the upper portion 66 of the sleeve 12 from the lower portion 68 of the sleeve 12. The remaining lower portion 68 of the sleeve 12 remains disposed about the pot 30 and/or the floral grouping 46 (that is, the growing medium 47), forming a decorative plant cover 74 (FIG. 10) which substantially surrounds and encompasses the pot 30 or the growing medium 47 or other retaining medium (not shown) in which the floral grouping 46 is disposed.

It will be understood that the decorative plant cover 74 (FIG. 10), and the second decorative plant cover described in detail below may comprise all of the characteristics of the pot 30. In a general method of use (FIGS. 1–2 and 8–10), an operator provides the sleeve 12, and the pot 30 having the floral grouping 46 disposed in the growing medium 47 contained within the pot 30. The operator then disposes the pot 30 having the floral grouping 46 therein into the sleeve 12 by opening the sleeve 12 at the first end 14 and assuring both that the opening 22 therein is in an open condition, and that the inner surface or inner periphery 24 of the sleeve 12 is somewhat expanded outward as well, as shown in FIGS. 1 and 8–10. The operator then disposes the pot 30 having the floral grouping 46 therein into the opening 22 in the sleeve 12, the pot 30 being disposed generally through the upper portion 66 of the sleeve 12 into generally the lower portion 68 of the sleeve 12, the pot 30 remaining in the lower portion 68 of the sleeve 12, permitting the sleeve 12 to substantially surround and tightly encompass the pot 30. It will be understood that alternatively, the sleeve 12 with the extension 58, as shown schematically in FIGS. 6–7, may be utilized, the sleeve 12 being disposed on rods, or wickets, (only one rod/wicket being designated 64), and the pot 30 then being disposed in the sleeve 12 either before or after the rods 64 are disposed through the extension 58 of the sleeve 12.

Alternatively, the pot 30 could be placed on a support device such as a pedestal (not shown) and the sleeve 12, disposed underneath the pot 30, could be pulled toward and over the pot 30 so as to substantially surround the pot 30 or at least a portion of the outer periphery or outer surface 38 of the pot 30. The bonding material 54 disposed on the pot 30, the sleeve 12, or both could then serve to connect the sleeve 12 to the pot 30.

The floral grouping 46 extends from the growing medium 47 in the pot retaining space 45 (FIG. 2) into the upper portion 66 of the sleeve 12 (FIGS. 1, 8 and 9), the material from which the sleeve 12 is formed having sufficient flexibility but also sufficient rigidity to both remain in and sustain its generally tubular or frusto-conical shape, thereby substantially surrounding and encompassing the floral grouping 46, particularly the stem portion 50 and the bloom portion 48 of the floral grouping 46. When the pot 30 is disposed adjacent the inner surface or inner periphery 24 of the sleeve 12, in the lower portion 68 of the sleeve 12, the bonding material 54 disposed on the inner surface or inner periphery 24 of the sleeve 12 and/or the outer surface or outer periphery 38 of the pot 30 connects the sleeve 12 and the pot 30 together, thereby securely bonding the sleeve 12 to the pot 30, and/or the pot 30 to the sleeve 12, depending upon the disposition of the bonding material 54, as shown in FIGS. 3–5 and described in detail previously.

Figure 8:
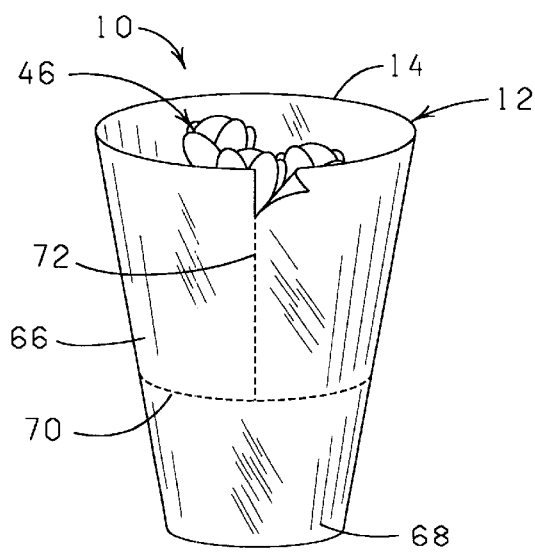
FIG. 8 is a perspective view of the plant package of FIG. 1, showing a partial detachment of the vertical perforations in the upper portion of the plant package.
Figure 9:
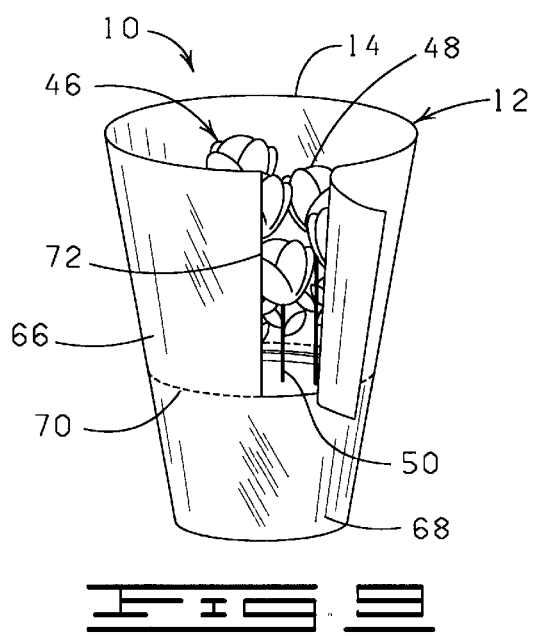
FIG. 9 is a perspective view of the plant package of FIG. 1, showing the upper portion of the sleeve being detached from the lower portion via both the vertical perforations in the upper portion and the circumferential perforations.
Figure 10:
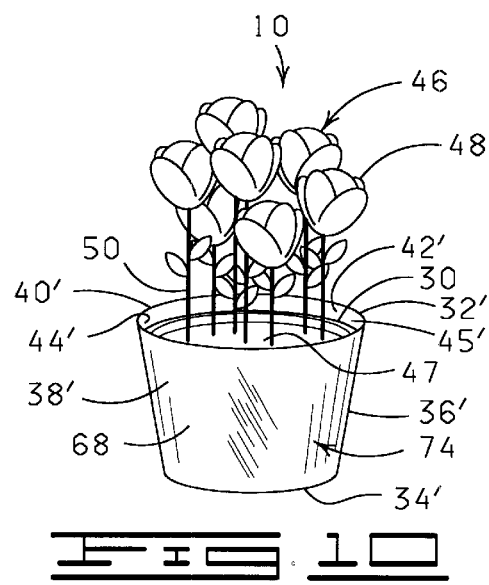
FIG. 10 is a perspective view of the plant package of FIG. 1, showing the upper portion of the sleeve detached, the remaining lower portion forming a decorative plant cover.

To remove the upper portion 66 of the sleeve 12, for example, but not by way of limitation, the operator generally grasps the sleeve 12 near the vertical perforations 72 and pulls one side of the upper portion 66 of the sleeve 12 away from the line of vertical perforations 72 and downward, thereby causing the sleeve 12 to tear away along the vertical perforations 72, as shown in FIGS. 8–9. When the sleeve 12 has separated along the vertical perforations 72 to the circumferential perforations 70, the operator then pulls the upper portion 66 of the sleeve 12 circumferentially about the pot 30, as illustrated in FIG. 9, thereby causing the upper portion 66 of the sleeve 12 to tear or separate along the line of circumferential perforations 70. The upper portion 66 of the sleeve 12 is then discarded, leaving the lower portion 68 of the sleeve 12 which forms the decorative plant cover 74 disposed about the pot 30, and which is at least partially bondingly connected to the pot 30 (FIG. 10). The lower portion 68 of the sleeve 12 which remains about the pot 30 may be equipped with a reservoir (not shown) to contain water, nutrients, preservatives, and/or hormones for nourishing the plant and/or floral grouping 46 after the upper portion 66 of the sleeve 12 has been removed.

Figure 11:
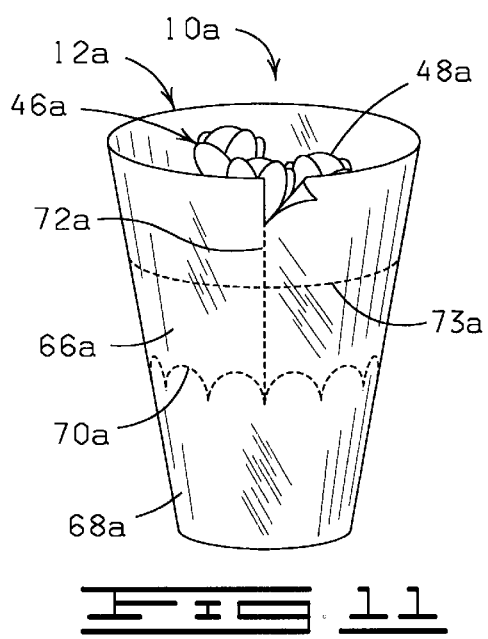
FIG. 11 is a perspective view of a modified plant package similar to the plant package shown in FIG. 1, showing a scalloped design formed by circumferential perforations.
Figure 12:
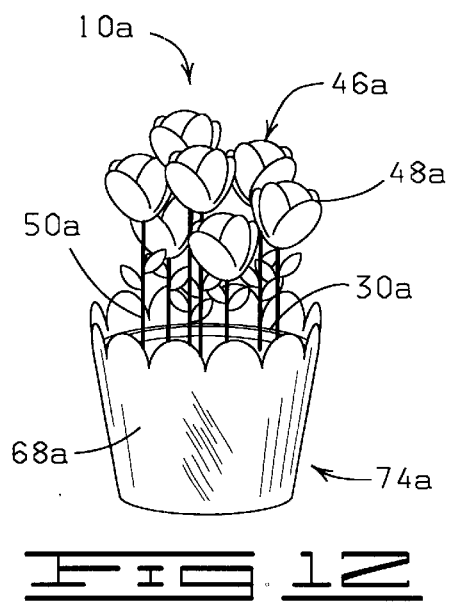
FIG. 12 is a perspective view of the plant package of FIG. 11, showing an upper portion of a sleeve removed, and showing a remaining lower portion forming a decorative plant cover.

The Embodiments and Methods of Use of FIGS. 11–12

Figure 11A:
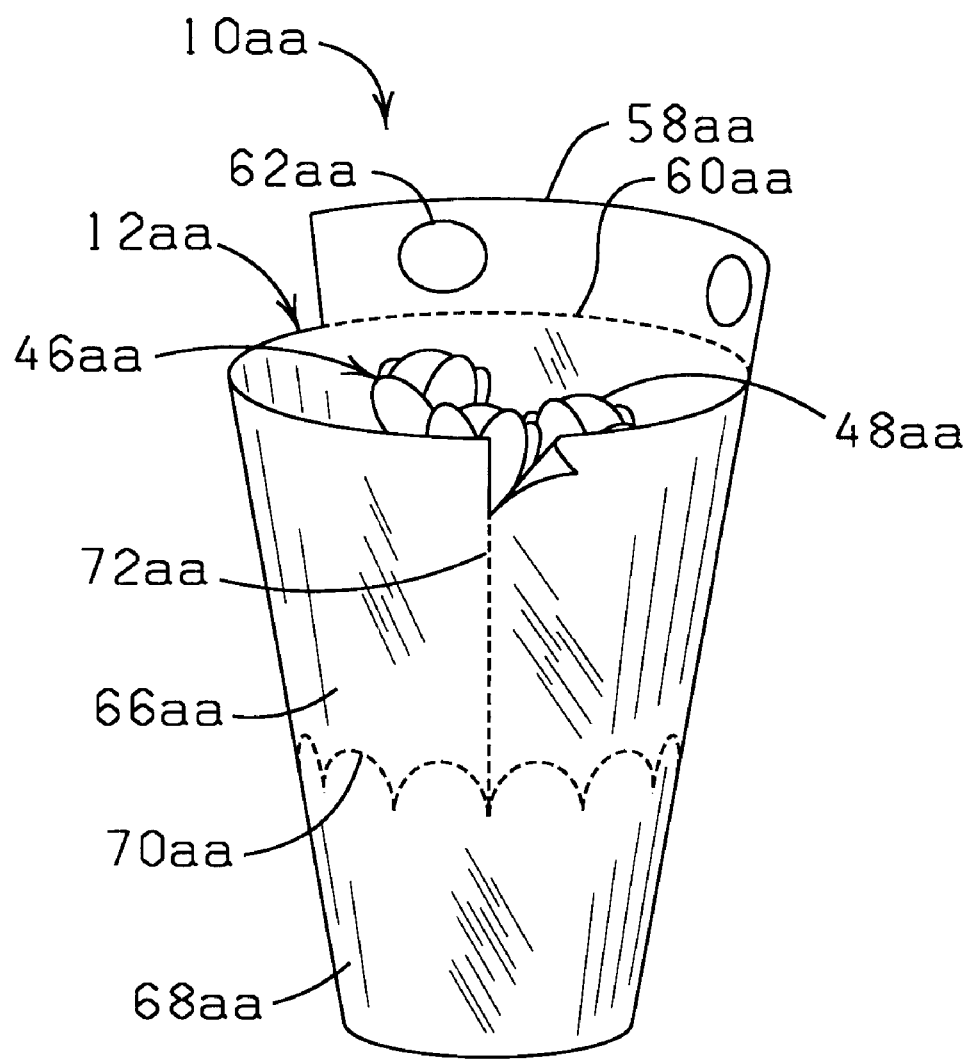
FIG. 11A is a perspective view of the plant package having a sleeve like the sleeve of FIG. 11, except also having a support extension.

FIGS. 11, 11A and 12 illustrate another embodiment and method of use of a plant package 10a of the present invention. A plant package 10a illustrated in this embodiment and used in this method is constructed exactly the same as the plant package 10 and sleeve 12 shown in FIGS. 1–10, and described in detail previously, except that sleeve 12a is constructed so that circumferential perforations 70a form a decorative design, namely, a scalloped design.

When an upper portion 66a of the sleeve 12a is removed by any method described herein or known in the art, a remaining lower portion 68a of the sleeve 12a forms a decorative plant cover similar to the decorative plant cover 74a (FIG. 12). It will be appreciated that the circumferential perforations 70a may form any decorative design, or combination of decorative designs. It will also be appreciated that additional decorative designs, created by vertical perforations 72a and/or the circumferential perforations 70a, will suggest themselves when the plant package 10a is utilized by those having ordinary skill in the art. Dashed line 73a represents an imaginary medial line of the upper portion 66a.

FIG. 11A illustrates another embodiment. Plant package 10aa illustrated in this embodiment and used in this method is constructed substantially the same as the plant package 10a shown in FIG. 11. Sleeve 12aa is constructed so that circumferential perforations 70aa form a decorative design, namely, a scalloped design. The plant package 10aa comprises a floral grouping 46aa having a bloom portion 48aa. The sleeve 12aa has an upper portion 66aa and a lower portion 68aa. When the upper portion 66aa is removed a decorative plant cover is formed like cover 74a of FIG. 12. It will be appreciated that the circumferential perforations 70aa may form any decorative design, or combination of decorative designs. It will also be appreciated that additional decorative designs, created by vertical perforations 72aa and/or the circumferential perforations 70aa, will suggest themselves when the plant package 10aa is utilized by those having ordinary skill in the art. Sleeve 12aa further comprises an extension 58aa having apertures 62aa. The extension 58aa is separable from the upper portion 66aa of the sleeve 12aa via perforations 60aa. The extension 58aa is used like extension 58 in FIGS. 6 and 7.

The Embodiments and Methods of Use of FIGS. 13–17

FIGS. 13–17 illustrate another embodiment and method of use of a plant package 10b and a sleeve 12b of the present invention. Plant package 10b and the sleeve 12b illustrated in this embodiment and used in this method are constructed exactly the same as the plant package 10 shown in FIGS. 1–10 and described in detail previously, except that sleeve 12b has a modified second end 16b which is closed, thereby forming a base 28. The sleeve 12b is formed from a sheet of material such as the sheet of material disclosed and described in U.S. Pat. No. 5,111,638 entitled "Method For Wrapping A Floral Grouping" issued to Weder et al., on May 12, 1992, which has been previously expressly incorporated by reference herein. In addition, the sleeve 12b formed from the sheet of material has a plurality of overlapping folds (only one of the plurality of overlapping folds designated by the numeral 77), which are formed by the use of a bonding material 54b (FIG. 14) on the sheet of material forming the sleeve 12b, by the use of heat shrinkable material known in the art and commercially available, or by any device or mechanical apparatus which forms sheet material into such a shape. Such mechanical apparatus are disclosed in U.S. Pat. No. 4,773,182, entitled, "Article Forming System," U.S. Pat. No. 4,897,031, entitled, "Article Forming System," U.S. Pat. No. 5,208,027, entitled "Article Forming System," and U.S. Pat. No. 5,307,606, entitled "Covering for Flower Pot and Floral Grouping," all of which are hereby expressly incorporated by reference herein.

Alternatively, gussets (not shown) are formed in the sheet of material which permit the sheet of material to be folded along the gussets and formed into the shape of the sleeve 12b, similar to the embodiment shown in FIGS. 13–17. Methods and apparatus for forming gussets in sheet material, and folding sheet material, are known to those having ordinary skill in the art.

The sleeve 12b also differs from the sleeve 12, because the sleeve 12b has a circumferential overlapping fold 78 which extends circumferentially about the sleeve 12b, as shown in FIGS. 13–15. In this embodiment, the bonding material 54b is disposed generally both above and near circumferential perforations 70b and below and near the circumferential perforations 70b. Bonding material 54b extends about the sleeve 12b in generally parallel alignment with the circumferential perforations 70b. The circumferential overlapping fold 78 is formed in this area. That is, a portion of an outer periphery or outer surface 18b of the sleeve 12b extending circumferentially around the sleeve 12b, near the circumferential perforations 70b, is folded under by tucking a portion of the outer surface 18b of the sleeve 12b (near the line of circumferential perforations 70b) under, thereby causing a portion of an inner surface or inner periphery 24b of the sleeve 12b to lie adjacent another portion of the inner surface or inner periphery 24b of the sleeve 12b or, as shown schematically in FIG. 14, creating a first fold 80. This first fold 80 causes a first portion 82 of the outer periphery or outer surface 18b of the sleeve 12b having the bonding material 54b thereon to overlap and lie adjacent a second portion 84 of the outer periphery or outer surface 18b of the sleeve 12b, the second portion 84 of the outer periphery or outer surface 18b also having bonding material 54b thereon. The first portion 82 contacts the second portion 84 and the first and second portions 82 and 84, respectively, are bondingly connected, as shown schematically in FIG. 14. (It will be appreciated that the connection between the first portion 82 and the second portion 84 will likely be much closer than the connection schematically shown in FIG. 14). In this manner, the circumferential overlapping fold 78 is created in the sleeve 12b. The circumferential fold 78 remains in place until an upper portion 66b of the sleeve 12b is removed as described herein.

In a general method of use, when the upper portion 66b of the sleeve 12b is removed (FIG. 15) as shown and described in detail previously herein, the remaining portion of the circumferential overlapping fold 78 forms a skirt 86 which extends about, and outwardly from, an opening 88 on a lower portion 68b, in a resulting decorative plant cover 74b as shown in FIGS. 16 and 17. The position of the skirt 86 may be altered by an operator releasing the bonding material 54b connecting both the first portion 82 and the second portion 84 of the outer periphery or outer surface 18b of the sleeve 12b from its bonded position. The skirt 86 may be formed so as to turn upwardly, inwardly, horizontally (upward or inward), downwardly, vertically (either upward or downward) or in any combination thereof, or in any obtuse or arbitrary angle or combination thereof.

An operator simply pulls the first portion 82 away from the second portion 84. Then, the skirt 86 may be arranged at different angles, such as the angle shown in FIG. 16, with the skirt 86 extending downwardly and outwardly, or such as the angle shown in FIG. 17, showing the skirt 86 extending upwardly and outwardly. It will be appreciated that a variety of skirt angles may be created, such as, but not by way of limitation, a horizontally extending skirt 86, or an upwardly and inwardly extending skirt 86. It will further be understood, by one having ordinary skill in the art, that the circumferential overlapping old 78 permits the formation of the skirt 86 as shown in FIGS. 16 and 17; that is, a skirt 86 which has a flare, and which is capable of being flared either outwardly, as illustrated, or inwardly (not shown). Further, the circumferential overlapping fold 78 protects the skirt 86 from being crushed or damaged before the upper portion 66b of the sleeve 12b is removed. Then, once the upper portion 66b is removed as described above, the operator may flare the skirt 86 as desired. It will be further appreciated that the circumferential overlapping fold 78 may overlap inwardly, toward a floral grouping 46b, rather than outwardly, as presently shown in FIGS. 13–15. Or, in a further alternative, skirt 86 may be formed without any circumferential overlapping fold 78.

The Embodiments and Methods of Use of FIGS. 18–21

FIGS. 18–21 illustrate another embodiment and method of use of a plant package 10c and sleeve 12c of the present invention. Plant package 10c and the sleeve 12c illustrated in this embodiment and used in this method are constructed exactly the same as the plant package 10 shown in FIGS. 1–10 and described in detail previously, except that a sleeve 12c has printed thereupon both a ribbon pattern 90 and a bow pattern 92, the ribbon pattern 90 extending about an outer periphery or outer surface 18c of the sleeve 12c, in a lower portion 68c of the sleeve 12c. Alternatively, an actual bow may be attached to the ribbon pattern 90 via a bonding material (not shown), rather than the bow pattern 92 being printed upon the sleeve 12c as the ribbon pattern 90 and a bow pattern 92.

In a method of use, an upper portion 66c of the sleeve 12c is removed by any method described herein to provide a decorative plant cover 74c (FIG. 20). The decorative plant cover 74c has the appearance of having a ribbon wrapped about and encircling the decorative plant cover 74c (only the lower portion 68c of the sleeve 12c being shown), the ribbon being decoratively tied into a bow (or, alternatively, a bow being attached to the ribbon 90).

Referring now to FIG. 21, the decorative plant cover 74c found from the lower portion 68c of the sleeve 12c has an actual ribbon 90c which extends circumferentially around the decorative plant cover 74c, and an actual bow 92c which is attached to the ribbon 90c or, alternatively, to the decorative plant cover 74c. The ribbon 90c and bow 92c are connected to the decorative plant cover 74c via a bonding material (not shown). The ribbon 90c and/or bow 92c comprise any material described herein or known in the art.

In a method of use, the ribbon 90c is connected to the lower portion 68c of the sleeve 12c via a bonding material in a manner which crimps the sleeve 12c somewhat in and near the ribbon 90c. Crimping sheet material is well known in the art. For example, the ribbon 90c may comprise a heat shrinkable material (known in the art and commercially available), and the ribbon 90c may be placed in a condition to crimp the lower portion 68c of the sleeve 12c by exposing the ribbon 90c (either before or after the upper portion 66c of the sleeve 12c is removed) to a heat source sufficient to cause the ribbon 90c to shrink and thereby crimp the lower portion 68c of the sleeve 12c. Such heat sources are known in the art and commercially available, such as, but not by way of limitation, a heat gun which blows heated air. The upper portion 66c of the sleeve 12c (FIGS. 18 and 19) is removed as described herein, leaving the lower portion 68c forming the decorative plant cover 74c having the ribbon 90c which crimps the plant cover 74c about a pot 30c or a floral grouping 46c (or growing medium (not shown)), the ribbon 90c being tied into the bow 92c, or a separate bow 92c being connected in any manner described herein to the ribbon 90c and/or the plant cover 74c. It will be appreciated that the ribbon 90c and/or bow 92c may be connected at any level of the pot 30c, or above the pot 30c, thereby crimping the plant cover 74c inward in a diameter smaller than the upper diameter of an upper rim 32c of the pot 30c, or, alternatively, connecting the ribbon 90c and/or bow 92c at any level of the plant cover 74c which encompasses the pot 30c. Alternatively, the ribbon 90c and/or bow 92c is connected to the sleeve 12c without crimping, as shown in FIG. 20 and described previously.

After the pot 30c has been disposed in a sleeve, such as the sleeve 12c, by any method described herein, a crimped portion 94 is formed by the ribbon 90c, the crimped portion 94 causing adjacent portions of an inner surface (not shown) and/or an outer periphery or outer surface 18c of the lower portion 68c of the sleeve 12c to come together, the bonding material on the ribbon 90c and/or sleeve 12c causing adjacent portions to be bonded together for forming the crimped portion 94. Crimping may be accomplished by hand or with a device or a machine as may be desired in a particular application. The crimped portion 94 may comprise only adjacent portions of the lower portion 68c of the sleeve 12c (FIGS. 18 and 19), or, alternatively, the crimped portion 94 of the lower portion 68c of the sleeve 12c may engage a portion of the pot 30c, the pot 30c having a bonding material on an outer surface thereof, (not shown), the bonding material on the pot 30c creating the crimped portion 94. Alternatively, any combination of the lower portion 68c of the sleeve 12c and/or the outer surface (not shown) of the pot 30c and/or the ribbon 90c which extends about the lower portion 68c of the sleeve 12c may create a crimped portion 94 of the lower portion 68c of the sleeve 12c, and such can be accomplished by hand or by any device or mechanical apparatus known in the art. The crimped portion 94 engages a portion of the pot 30c for cooperating to maintain the lower portion 68c of the sleeve 12c assembled about and/or connected to the pot 30c.

The crimped portion 94 (FIG. 21) preferably extends circumferentially about the outer surface (not shown) of the pot 30c and/or floral grouping 46c (that is, primarily, the growing medium 47c). In some applications, it may be desirable to form the crimped portion 94 only at certain positions spaced circumferentially about the lower portion 68c of the sleeve 12c. Methods of crimping are also shown in U.S. Pat. No. 5,809,629, issued Sep. 22, 1998, entitled "Method and Apparatus For Forming a Decorative Cover"; U.S. Pat. No. 5,361,482, issued Nov. 8, 1994, entitled, "Flower Pot Cover With Crimped Portion"; and U.S. Pat. No. 5,428,939, issued Jul. 4, 1995, entitled, "Method For Crimping A Wrapper About a Floral Grouping", all of which are hereby specifically incorporated by reference herein.

In a further alternative, the sleeve 12c is constructed with more than one material, so that the ribbon pattern 90 forms an integral part of the sleeve 12c, but the ribbon pattern 90 further comprises a material different from the material of the remainder of the sleeve 12c, such as but not by way of limitation, heat shrinkable material, as described previously. Such ribbon pattern 90 may be shrunk to cause a crimping condition of a portion of the plant cover 74c (FIG. 21), as described above, or may remain unshrunk, as shown in FIG. 20. It will be appreciated that the sleeve 12c may also be formed with a closed bottom, as shown and described in detail herein previously.

Further, it will be appreciated that the ribbon 90c shown and/or described herein may comprise a band. The term "band" when used herein means any material which may be secured about an object such as a pot, or a sleeve, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering material to removably or substantially permanently form a crimped portion and secure the crimped portion formed in the material which may be secured about an object such as the pot. The band also may include the bow 92c if desired in a particular application.

In another embodiment of the present invention, a sleeve similar to the sleeve 12c may be free of the ribbon pattern 90 and bow pattern 92 or of the ribbon 90c and the bow 92c and thus in appearance may be similar to sleeve 12 indicated in FIG. 1. However, the lower portion 68c of the sleeve 12c which surrounds the outer surface (not shown) of the pot 30c may be formable into the plant cover 74c having a plurality of overlapping folds 77c formed in a random or predetermined arrangement and style substantially as shown in FIG. 21. In this embodiment, after the pot 30c has been disposed into sleeve 12c, the lower portion 68c of the sleeve 12c is formed manually or automatically into the plant cover 74c having a plurality of the overlapping folds 77c or pleats thus giving the lower portion 68c of the sleeve 12c the appearance of the plant cover 74c formed about the pot 30c, wherein the plant cover 74c would be free of the ribbon pattern 90 at the bow pattern 92 or the ribbon 90c at the bow 92c. In other words, the lower portion 68c of the sleeve 12c is formed into the decorative plant cover 74c with overlapping folds 77c in a manner similar to that described above when the sleeve 12c is crimped about the outer surface (not shown) of the pot 30c. The overlapping portions of the folds 77c may be connected by a bonding material such as an adhesive or cohesive disposed upon an outer surface 20c of the sleeve 12c; or, the overlapping portions of the folds may be connected with a bonding material such as an adhesive or cohesive applied to the inner surface (not shown) of the lower portion 68c of the sleeve 12c. Alternatively, the bonding material may be on the outer surface (not shown) of the pot 30c for causing portion of the sleeve 12c to bond to the outer surface of the pot 30c. Alternatively, the bonding material may be disposed both on the outer surface (not shown) of the pot 30c and on an inner surface (not shown) or outer surface 20c of the lower portion 68c of the sleeve 12c. Alternatively, the bonding material may be disposed on both the inner surface (not shown) and outer surface 20c of the sleeve 12c but not on the outer surface (not shown) of the pot 30c. Alternatively, the bonding material may be on both the inner and outer surfaces of the sleeve 12c and on the outer surface of the pot 30c.

Another method in which overlapping folds 77c may be formed in the lower portion 68c of the sleeve 12c is shown in U.S. Pat. No. 5,291,721, issued Mar. 8, 1994, entitled "Cover Forming Apparatus Having Pivoting Forming Members," issued Mar. 8, 1994.

The lower portion 68c of the sleeve 12c may be formed into a portion having folds 77c either before or after the upper portion 66c of the sleeve 12c has been detached from the remaining lower portion 68c FIG. 21. After the upper portion 66c of the sleeve 12c has been removed, the remaining lower portion 68c of the sleeve 12c now constitutes the plant cover 74c. The plant cover 74c, as noted, comprises a plurality of overlapping folds 77c. The plant cover 74c may be removable from the pot 30c, or may be firmly connected to the outer surface (not shown) of the pot 30c by a bonding material disposed, as noted above, either on the outer surface of the pot 30c or on the inner surface (not shown) of the lower portion 68c of the sleeve 12c.

It will also be understood by one of ordinary skill in the art that the sleeve may have a portion which forms a skirt 86c, such that when the removable upper portion 66c of the sleeve 12c is detached, the plant cover 74c with he skirt 86c remains.

The Embodiments and Methods of Use of FIGS. 22–29

FIGS. 22–25 illustrate another embodiment and method of use of a plant package 10d and a sleeve 12d of the present invention. The plant package 10d illustrated in this embodiment and used in this method is constructed exactly the same as the plant package 10c shown in FIGS. 18–21 and described in detail previously, except that vertical perforations 72d in sleeve 12d extend below circumferential perforations 70d and into a lower portion 68d of the sleeve 12d. A pot (not shown) can be disposed within the lower portion 68d of the sleeve 12d; and can be disposed in an underlying second decorative plant cover 96 (FIGS. 23–25) (identical to the previously described plant cover 74 or, alternatively, either a flower pot cover known in the art or, in a further alternative, the pot), is contained within the sleeve 12d. The circumferential perforations 70d comprise two parallel lines of circumferential perforations (only one line of circumferential perforations designated by the numeral 70d). A ribbon 90d and bow 92d are utilized in this embodiment and method, and may comprise any ribbon 90d and/or bow 92d shown and/or described herein, or known in the art.

The sleeve 12d may be completely removed from about the underlying second decorative cover 96 and/or pot (not shown), except for the ribbon 90d and bow 92d. The ribbon 90d may extend about the second decorative plant cover 96, as shown in FIG. 24, in a non-crimped condition. Alternatively, the ribbon 90d may extend about the second plant cover 96 in a crimped condition, as shown in FIG. 25, and as previously described herein.

Alternatively, an upper portion 66d of the sleeve 12d may be removed, by any method described herein, and a lower portion 68d of the sleeve 12d may remain about at least a portion of a second plant cover 96 (FIG. 23) or pot 30d as a decorative plant cover 74d (FIG. 27). In a further alternative, the lower portion 68d of the sleeve 12d is removed while the upper portion 66d remains in place, forming a skirt 86d (FIG. 29). The upper portion 66d comprises a plurality of decorative sections (only one section being designated 97) defined by a plurality of decorative perforations (only one of the decorative perforations being designated by the numeral 97'). A portion of the upper portion 66d of the sleeve 12d is torn away along the decorative perforations 97' in a method previously described herein and known in the art, leaving the decorative sections 97 in the upper portion 66d of the sleeve 12d. In still a further alternative, no second decorative plant cover is utilized, that is, only a pot 30d with a floral grouping 46d therein is used. The upper portion 66d of the sleeve 12d is removed via any method described herein, leaving the ribbon 90d and/or bow 92d as well as the lower portion 68d of the sleeve 12d which together with the ribbon 90d and/or bow 92d forms the decorative plant cover 74d about the pot 30d (FIGS. 26–27). It will be appreciated that the sleeve 12d may also be formed with a closed second end, as shown and described in detail herein previously.

The Embodiments and Methods of Use of FIGS. 30–32

FIGS. 30–32 illustrate another embodiment and method of use of a plant package 10e at sleeve 12e of the present invention. A plant package 10e illustrated in this embodiment and used in this method is constructed exactly the same as the plant package 10d shown in FIGS. 22–25 and described in detail previously, except that sleeve 12e comprises only an upper portion 66e and a ribbon 90e and a pull bow 92e, the pull bow 92e has a pull portion 100 attached to the upper portion 66e of the sleeve 12e, so that when the upper portion 66e of the sleeve 12e is removed, the pull portion 100 pulls the pull bow 92e into a plurality of decorative loops (shown schematically using four loops in FIG. 32). The pull portion 100 is detachable from the pull bow 92e once the pull bow 92e is formed into the plurality of loops. The ribbon 90e may comprise any ribbon shown and/or described herein.

In a method of use, the upper portion 66e of the sleeve 12e is detached by any method described herein. The pull portion 100 causes ribbon within the pull bow 92e to gather into the plurality of decorative loops, the beginning of this operation being shown in FIG. 31, as the upper portion 66e of the sleeve 12e is pulled away. The pull portion 100 is detached from the pull bow 92e by any method known by those having ordinary skill in the art, leaving a second decorative plant cover 96e having the ribbon 90e extending thereabout, and having a multiple loop pull bow 92e, as illustrated in FIG. 32. It will be appreciated that the ribbon 90e may crimp the second decorative plant cover 96e, as previously described herein. Further, it will be appreciated that the ribbon 90e and/or pull bow 92e may be utilized with any embodiment shown and/or described herein. In such variations, the pull portion 100 of the pull bow 92e may be attached to the upper portion 66e of the sleeve 12e, to a lower portion (not shown) of the sleeve 12e, or may be unattached, so that an operator may pull the pull section 100 to form the pull bow 92e without detaching any portion of the sleeve, or only the upper portion 66e of the sleeve 12e, or, in a further alternative, only a lower portion (not shown) of a sleeve such as the lower portion 68d of the sleeve 12d.

As shown in FIGS. 30–32, the plant package 10e comprises a pot (not shown) and the second decorative plant cover 96e which is disposed about the pot. It will be understood by a person of ordinary skill in the art that the second decorative plant cover 96e shown in FIGS. 30–32 is only one of a number of versions of plant covers which may be employed in the invention described herein. In particular, the second decorative plant cover 96e may be formed from a sheet of material which is formed into a cover about the outer surface (not shown) of a pot either by hand or automatically, as previously described herein. The second decorative plant cover 96e may or may not further comprise a skirt. The second decorative plant cover 96e may be a preformed plant cover such as one produced by the method described in U.S. Pat. No. 4,773,182, expressly incorporated by reference above. The second decorative plant cover 96e may have a plurality of overlapping folds as herein before described. Alternatively, the body of the second decorative plant cover 96e may be substantially free of overlapping folds and may have the appearance of a sleeve. The bottom of the second decorative plant cover 96e may be flattened, gusseted, or simply sealed along an edge.

The second decorative plant cover 96e may have a bonding material (not shown) disposed upon a portion thereof, including either an inner surface (FIG. 32) or an outer surface or both the inner surface 42e and outer surface 38e, for attaching either to a pot, or to the sleeve 12e, or to both a pot 30e and the sleeve 12e. Alternatively, the second decorative plant cover 96e may be free of a bonding material. The sleeve 12e applied to the second decorative plant cover 96e may have a bonding material disposed either on an inner surface or inner periphery 24e (FIG. 31) or an outer surface 20e (FIGS. 30 and 31), or both the inner surface 24e and outer periphery or outer surface 18e of the sleeve 12a, for bonding the sleeve 12e to the second decorative plant cover 96e. Alternatively, the sleeve 12e may be free of a bonding material on any surface thereof. Although the sleeve 12e in FIGS. 30–32 is shown as having the pull bow 92e, it will be understood by one of ordinary skill in the art that the sleeve 12e may be free of the pull bow 92e and when a portion of the sleeve 12e is detached, the portion of the sleeve 12e may be left surrounding the second decorative plant cover 96e so that the second decorative plant cover 96e remains firmly bound about the outer surface 38e of the second decorative plant cover 96e, or it may provide a decorative function as well as described elsewhere herein.

As noted herein, the sleeve 12 may have perforations in various patterns to facilitate removal of portions or a portion of the sleeve 12 or of the entire sleeve 12. The sleeve 12 may have other means as described elsewhere herein for facilitating the removal of a portion or portions of the sleeve 12, or of the entire sleeve 12.

In a final embodiment reference will again be made to FIG. 1. The plant package may comprise a pot having a floral grouping and a sleeve the sleeve comprising only a lower portion (the sleeve having no perforations therein, or detaching elements), a portion of the sleeve near the first end and opening extends away from the sleeve so as to form a decorative skirt (not shown) when the sleeve is positioned about the pot. The sleeve is positionable about the pot and the sleeve closely surrounds and encompasses the pot when positioned about the pot. It will be understood that either the sleeve and/or the decorative skirt may have overlapping folds or gussets which permit the formation of the decorative skirt. Alternatively, no overlapping folds or gussets may be utilized. In a further alternative, a wider portion of the sleeve may be cut from the material forming the sleeve, which assists in the formation of the decorative skirt. The decorative skirt is positionable at differing angles, as described previously herein. It will be appreciated that the sleeve may be provided with a bonding material disposed thereupon, the pot may be provided with a bonding material disposed thereupon, or both the sleeve and the pot may have a bonding material disposed thereupon, as previously described herein. Further, the decorative skirt may also have a bonding material disposed thereupon, on either surface of the decorative skirt.

In a method of use, a pot is positioned within the sleeve, as previously described herein, and the combination of the sleeve and the decorative skirt forms a decorative plant cover. It will be appreciated that at least a portion of the decorative plant cover substantially surrounds and encompasses the pot.

Changes may be made in the construction and the operation of the various components, elements and assemblies described herein or in the steps or the sequence of steps of the methods described herein without departing from the spirit and scope of the invention as defined in the following claims.

What is claimed is:

1. A covering for a pot, the pot having an upper rim, a lower end, an outer peripheral surface, and a shape, the covering comprising:
   a flexible sleeve having an upper portion and a lower portion, the lower portion comprising a base portion and a decorative skirt portion, and the flexible sleeve having perforations which demarcate an upper edge of the decorative skirt portion and wherein the upper portion is detachable from the lower portion via the perforations and wherein the base portion of the lower portion is sized to surround the outer peripheral surface of the pot and the decorative skirt portion is sized to extend a distance above the upper rim of the pot and wherein at least a portion of the perforations are positioned to be near the upper rim of the pot and below a medial line of the upper portion when the pot is disposed within the base portion of the lower portion of the flexible sleeve.

2. The covering of claim 1 wherein the flexible sleeve is further defined as having a first end, a second end, an outer periphery which forms an outer surface, the flexible sleeve having an opening which intersects the first end and extends to a bottom forming an inner surface defined by an inner periphery which forms a retaining space.

3. The covering of claim 1 wherein the perforations in the flexible sleeve further comprise both vertical perforations and circumferential perforations.

4. The covering of claim 1 wherein the flexible sleeve is constructed from a material selected from the group consisting of untreated or treated paper in any manner, foil, polymeric film, fabric, burlap, cloth, and any combination thereof.

5. The covering of claim 1 wherein the flexible sleeve further comprises an extension, the extension having at least one aperture.

6. The covering of claim 1 wherein the flexible sleeve further comprises at least one of a ribbon and a bow.

7. The covering of claim 1 wherein the upper portion of the flexible sleeve is sized to surround and encompass a floral grouping disposed within the pot.

8. The covering of claim 1 wherein the base portion of the flexible sleeve has a closed bottom.

9. A covering for a pot, the pot having an upper rim, a lower end, an outer peripheral surface, and a shape, the covering comprising:
   a flexible sleeve having an upper portion and a lower portion, the lower portion comprising a base portion and a decorative skirt portion, the flexible sleeve having perforations which demarcate an upper edge of the decorative skirt portion and wherein the upper portion is detachable from the lower portion via the perforations and wherein the base portion of the lower portion is sized to contain and surround the outer peripheral surface of the pot and the decorative skirt portion is sized to extend a distance above the upper rim of the pot and wherein at least a portion of the perforations are positioned to be near the upper rim of the pot and below a medial line of the upper portion of the flexible sleeve when the pot is disposed within the base portion of the lower portion of the flexible sleeve and wherein the flexible sleeve further comprises a bonding material for securing the flexible sleeve about the pot when the pot is disposed within the flexible sleeve.

10. The covering of claim 9 wherein the bonding material is selected from the group consisting of an adhesive or cohesive material, ties, labels, bands, ribbons, strings, tapes and heat shrinkable materials.

11. The covering of claim 9 wherein the base portion has a tapered shape.

12. The covering of claim 9 wherein the base portion has a closed bottom.

13. The covering of claim 9 wherein the flexible sleeve is further defined as constructed from a material selected from the group consisting of untreated or treated paper, foil, polymeric film, cellophane, fabric, cloth, burlap, or any combination thereof.

14. The covering of claim 9 wherein the flexible sleeve is adapted to be supported from a support assembly.

15. The covering of claim 9 wherein the upper portion of the flexible sleeve is sized to surround and encompass a floral grouping disposed within the pot.

16. A covering for a pot, the pot having an upper rim, a lower end, an outer peripheral surface, and a shape, the covering comprising:
   a flexible sleeve having an upper portion and a lower portion, the lower portion comprising a base portion and a decorative skirt portion, the flexible sleeve having perforations which demarcate an upper edge of the decorative skirt portion and wherein the upper portion is detachable from the lower portion via the perforations and wherein the base portion of the lower portion is sized to contain and surround the outer peripheral surface of the pot and the decorative skirt portion is sized to extend a distance above the upper rim of the pot and wherein at least a portion of the perforations are positioned to be near the upper rim of the pot and below a medial line of the upper portion when the pot is disposed within the base portion of the lower portion of the flexible sleeve and wherein the flexible sleeve further comprises a bonding material for securing the flexible sleeve about the pot when the pot is disposed within the flexible sleeve and wherein the base portion has a closed bottom.

17. The covering of claim 16 wherein the bonding material is selected from the group consisting of an adhesive or cohesive material, ties, labels, bands, ribbons, strings, tapes and heat shrinkable materials.

18. The covering of claim 16 wherein the flexible sleeve is further defined as constructed from a material selected from the group consisting of untreated or treated paper, foil, polymeric film, cellophane, fabric, cloth, burlap, or any combination thereof.

19. The covering of claim 16 wherein the flexible sleeve is adapted to be supported from a support assembly.

20. The covering of claim 16 wherein the upper portion of the flexible sleeve is sized to surround and encompass a floral group ing disposed within the pot.

21. A covering for a pot, the pot having an upper rim, a lower end, an outer peripheral surface, and a shape, the covering comprising:

a flexible sleeve having an upper portion and a lower portion, the lower portion comprising a base portion and a decorative skirt portion, the flexible sleeve having perforations which demarcate an upper edge of the decorative skirt portion and wherein the upper portion is detachable from the lower portion via the perforations and wherein the base portion of the lower portion is sized to contain and surround the outer peripheral surface of the pot and the decorative skirt portion is sized to extend a distance above the upper rim of the pot and wherein at least a portion of the perforations are positioned to be near the upper rim of the pot and below a medial line of the upper portion when the pot is disposed within the base portion of the lower portion of the flexible sleeve and wherein the flexible sleeve further comprises a bonding material for securing the flexible sleeve about the pot when the pot is disposed within the flexible sleeve and wherein the base portion has a tapered shape.

22. The covering of claim 21 wherein the bonding material is selected from the group consisting of an adhesive or cohesive material, ties, labels, bands, ribbons, strings, tapes and heat shrinkable materials.

23. The covering of claim 21 wherein the flexible sleeve is further defined as having a closed bottom.

24. The covering of claim 21 wherein the flexible sleeve is further defined as constructed from a material selected from the group consisting of untreated or treated paper, foil, polymeric film, cellophane, fabric, cloth, burlap, or any combination thereof.

25. The covering of claim 21 wherein the flexible sleeve is adapted to be supported from a support assembly.

26. The covering of claim 21 wherein the upper portion of the flexible sleeve is sized to surround and encompass a floral grouping disposed within the pot.

27. A covering for a pot, the pot having an upper rim, a lower rim, a lower end, an outer peripheral surface, and a shape, the covering comprising:

a flexible sleeve having an upper portion and a lower portion, the lower portion comprising a base portion and a decorative skirt portion, the flexible sleeve having perforations which demarcate an upper edge of the decorative skirt portion and wherein the upper portion is detachable from the lower portion via the perforations and wherein the base portion of the lower portion is sized to surround the outer peripheral surface of the pot and the decorative skirt portion is sized to extend a distance above the upper rim of the pot and wherein at least a portion of the perforations are positioned to be near the upper rim of the pot and below a medial line of the upper portion when the pot is disposed within the base portion of the lower portion of the flexible sleeve and wherein the flexible sleeve further comprises a bonding material for securing the flexible sleeve about the pot when the pot is disposed within the flexible sleeve and wherein the base portion has a tapered shape and a closed bottom.

28. The covering of claim 27 wherein the bonding material is selected from the group consisting of an adhesive or cohesive material, ties, labels, bands, ribbons, strings, tapes and heat shrinkable materials.

29. The covering of claim 27 wherein the flexible sleeve is further defined as constructed from a material selected from the group consisting of untreated or treated paper, foil, polymeric film, cellophane, fabric, cloth, burlap, or any combination thereof.

30. The covering of claim 27 wherein the flexible sleeve is adapted to be supported from a support assembly.

31. The covering of claim 27 wherein the upper portion of the flexible sleeve is sized to surround and encompass a floral grouping disposed within the pot.

* * * * *